United States Patent
Beard et al.

(10) Patent No.: US 10,489,304 B2
(45) Date of Patent: Nov. 26, 2019

(54) MEMORY ADDRESS TRANSLATION

(71) Applicant: ARM LTD, Cambridge (GB)

(72) Inventors: Jonathan Curtis Beard, Austin, TX (US); Roxana Rusitoru, Cambridge (GB); Curtis Glenn Dunham, Austin, TX (US)

(73) Assignee: Arm Limited, Cambridge (GB)

( * ) Notice: Subject to any disclaimer, the term of this patent is extended or adjusted under 35 U.S.C. 154(b) by 81 days.

(21) Appl. No.: 15/650,056

(22) Filed: Jul. 14, 2017

(65) Prior Publication Data

US 2019/0018789 A1    Jan. 17, 2019

(51) Int. Cl.
*G06F 12/1027* (2016.01)
*G06F 12/1036* (2016.01)
(Continued)

(52) U.S. Cl.
CPC ............ *G06F 12/1027* (2013.01); *G06F 9/32* (2013.01); *G06F 9/342* (2013.01); *G06F 9/3851* (2013.01);
(Continued)

(58) Field of Classification Search
CPC ............... G06F 3/00; G06F 3/06–0689; G06F 5/00–16; G06F 9/00–548;
(Continued)

(56) References Cited

U.S. PATENT DOCUMENTS

| 4,347,565 A | 8/1982 | Kaneda et al. |
| 4,792,897 A | 12/1988 | Gotou et al. |

(Continued)

FOREIGN PATENT DOCUMENTS

| EP | 3 128 415 | 2/2017 |
| WO | WO 2016/160220 | 10/2016 |

(Continued)

OTHER PUBLICATIONS

Virtual Memory Management: TLB Prefetching & Page Walk; Bai et al.; Nov. 3, 2011; retrieved from http://www2.ece.rochester.edu/~yubai/papers/vm_yuxin_yanwei.pdf on Jan. 26, 2019 (Year: 2011).*

(Continued)

*Primary Examiner* — Daniel C. Chappell
(74) *Attorney, Agent, or Firm* — Leveque IP Law, P.C.

(57) ABSTRACT

A memory address translation apparatus comprises a translation data store to store one or more instances of translation data. Each instance provides address range boundary values defining a range of virtual memory addresses between respective virtual memory address boundaries in a virtual memory address space, and indicates a translation between a virtual memory address in the range of virtual memory addresses and a corresponding output memory address in an output address space. When a given virtual memory address to be translated lies outside the ranges of virtual memory addresses defined by any instances of the translation data stored by the translation data store, detector circuitry retrieves one or more further instances of the translation data and translation circuitry applies the translation defined by a detected instance of the translation data to the given virtual memory address.

18 Claims, 7 Drawing Sheets

(51) Int. Cl.
  *G06F 12/0888* (2016.01)
  *G06F 12/14* (2006.01)
  *G06F 9/32* (2018.01)
  *G06F 9/34* (2018.01)
  *G06F 9/38* (2018.01)
  *G06F 11/07* (2006.01)

(52) U.S. Cl.
  CPC ........ *G06F 11/073* (2013.01); *G06F 12/1036* (2013.01); *G06F 12/0888* (2013.01); *G06F 12/145* (2013.01); *G06F 2212/1024* (2013.01); *G06F 2212/1044* (2013.01); *G06F 2212/1052* (2013.01); *G06F 2212/151* (2013.01); *G06F 2212/657* (2013.01)

(58) Field of Classification Search
  CPC ..... G06F 11/00–3696; G06F 12/00–16; G06F 13/00–4295; G06F 16/00–986; G06F 17/00–5095; G06F 21/00–88; G06F 2003/0691–0698; G06F 2009/3883; G06F 2009/45562–45595; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G11C 15/00–06; G11C 16/00–3495; G11C 17/00–18; G11C 2216/00–30; H04L 49/00–9094; H04L 61/00–6095
  See application file for complete search history.

(56) References Cited

U.S. PATENT DOCUMENTS

| | | | |
|---|---|---|---|
| 5,361,337 A | 11/1994 | Okin | |
| 5,426,750 A | 6/1995 | Becker et al. | |
| 5,577,231 A | 11/1996 | Scalzi et al. | |
| 5,752,275 A | 5/1998 | Hammond | |
| 5,867,649 A | 2/1999 | Larson | |
| 6,021,476 A * | 2/2000 | Segars ................ G06F 12/1441 |
| | | | 711/151 |
| 6,345,241 B1 | 2/2002 | Brice | |
| 6,349,355 B1 | 2/2002 | Draves et al. | |
| 6,633,963 B1 | 10/2003 | Ellison et al. | |
| 6,704,873 B1 | 3/2004 | Underwood | |
| 6,715,145 B1 | 3/2004 | Bowman-Amuah | |
| 6,731,288 B2 | 5/2004 | Parsons | |
| 6,789,156 B1 | 9/2004 | Waldspurger | |
| 6,822,959 B2 | 11/2004 | Galbi et al. | |
| 7,181,594 B2 | 2/2007 | Wilkinson et al. | |
| 7,225,300 B1 | 5/2007 | Choquette et al. | |
| 7,343,603 B1 | 3/2008 | Fresko | |
| 7,356,667 B2 | 4/2008 | Harris et al. | |
| 7,373,466 B1 | 5/2008 | Conway | |
| 7,424,599 B2 | 9/2008 | Kissell et al. | |
| 7,437,724 B2 | 10/2008 | Wolrich et al. | |
| 7,472,253 B1 | 12/2008 | Cameron et al. | |
| 7,512,769 B1 | 3/2009 | Lowell et al. | |
| 7,668,165 B2 | 2/2010 | Hoskote | |
| 8,250,519 B2 | 8/2012 | Budko et al. | |
| 8,327,187 B1 | 12/2012 | Metcalf | |
| 8,386,745 B2 | 2/2013 | Kegel et al. | |
| 8,656,397 B2 | 2/2014 | Eidus et al. | |
| 8,667,249 B2 | 3/2014 | Baxter et al. | |
| 8,850,168 B2 | 9/2014 | Yamamoto et al. | |
| 8,984,255 B2 | 3/2015 | Hsu et al. | |
| 9,081,501 B2 | 7/2015 | Asaad et al. | |
| 9,081,706 B2 | 7/2015 | Koka et al. | |
| 9,122,714 B2 | 9/2015 | Varadarajan et al. | |
| 9,208,103 B2 | 12/2015 | Kessler et al. | |
| 9,235,529 B2 | 1/2016 | Koka et al. | |
| 9,250,901 B2 | 2/2016 | Sodhi et al. | |
| 9,251,089 B2 | 2/2016 | Gschwind | |
| 9,268,694 B2 | 2/2016 | Snyder et al. | |
| 9,367,459 B2 | 6/2016 | Yamashita et al. | |
| 9,582,312 B1 | 2/2017 | Karppanen | |
| 9,639,476 B2 | 5/2017 | Chin et al. | |
| 9,645,941 B2 | 5/2017 | Mukherjee et al. | |
| 9,690,714 B1 | 6/2017 | Sites | |
| 9,785,557 B1 | 10/2017 | Frey et al. | |
| 9,954,681 B2 * | 4/2018 | Case ........................ G09C 1/00 |
| 9,996,386 B2 | 6/2018 | Rauchfuss et al. | |
| 10,037,227 B2 | 7/2018 | Therien et al. | |
| 10,082,975 B1 * | 9/2018 | Shenoy ................ G06F 3/0623 |
| 10,114,958 B2 | 10/2018 | Sell | |
| 10,133,675 B2 | 11/2018 | Hansson et al. | |
| 10,180,913 B1 * | 1/2019 | Aingaran ................ G06F 12/10 |
| 2002/0026502 A1 | 2/2002 | Phillips | |
| 2004/0064668 A1 * | 4/2004 | Kjos .................... G06F 12/1027 |
| | | | 711/202 |
| 2004/0117593 A1 * | 6/2004 | Uhlig .................. G06F 12/1036 |
| | | | 711/207 |
| 2004/0215893 A1 | 10/2004 | Emerson et al. | |
| 2005/0010728 A1 | 1/2005 | Piry et al. | |
| 2005/0165758 A1 | 7/2005 | Kasten et al. | |
| 2005/0138515 A1 | 8/2005 | Hyduke | |
| 2005/0273571 A1 | 12/2005 | Lyon et al. | |
| 2006/0253894 A1 | 11/2006 | Bookman | |
| 2006/0277390 A1 | 12/2006 | Zuraski et al. | |
| 2006/0288177 A1 | 12/2006 | Shaw | |
| 2007/0180197 A1 | 8/2007 | Wright | |
| 2007/0186054 A1 | 8/2007 | Kruckmeyer et al. | |
| 2008/0104557 A1 | 5/2008 | Gopaladrishnan et al. | |
| 2008/0270653 A1 | 10/2008 | Balle et al. | |
| 2009/0089537 A1 | 4/2009 | Vick et al. | |
| 2009/0113164 A1 | 4/2009 | Rajamony et al. | |
| 2009/0172343 A1 * | 7/2009 | Savagaonkar ...... G06F 12/1036 |
| | | | 711/207 |
| 2009/0182971 A1 * | 7/2009 | Greiner ................ G06F 12/1009 |
| | | | 711/206 |
| 2009/0234987 A1 | 9/2009 | Lee et al. | |
| 2011/0113410 A1 | 5/2011 | Loen | |
| 2011/0145542 A1 * | 6/2011 | Morrow ............... G06F 12/1027 |
| | | | 711/207 |
| 2011/0208935 A1 | 8/2011 | Grisenthwaite | |
| 2012/0324148 A1 | 12/2012 | Stonelake et al. | |
| 2013/0179666 A1 | 7/2013 | Yamashita et al. | |
| 2013/0227248 A1 | 8/2013 | Mehta et al. | |
| 2014/0006734 A1 | 1/2014 | Li et al. | |
| 2014/0013074 A1 | 1/2014 | Koka | |
| 2014/0052917 A1 | 2/2014 | Koka et al. | |
| 2014/0208064 A1 | 7/2014 | Basu et al. | |
| 2014/0281363 A1 | 9/2014 | Tian | |
| 2014/0351519 A1 | 11/2014 | Munoz | |
| 2015/0106571 A1 | 4/2015 | Bernard et al. | |
| 2015/0205885 A1 | 7/2015 | Zhou et al. | |
| 2015/0254104 A1 | 9/2015 | Kessler et al. | |
| 2015/0286639 A1 | 10/2015 | Bordawekar | |
| 2015/0301949 A1 | 10/2015 | Koka et al. | |
| 2015/0301951 A1 * | 10/2015 | Bybell ................. G06F 12/1027 |
| | | | 711/207 |
| 2015/0325272 A1 | 11/2015 | Murphy | |
| 2016/0085677 A1 | 3/2016 | Loh et al. | |
| 2016/0147555 A1 | 5/2016 | Hepkin | |
| 2016/0147620 A1 | 5/2016 | Lesartre et al. | |
| 2016/0239415 A1 | 8/2016 | David et al. | |
| 2016/0283399 A1 | 9/2016 | Das | |
| 2017/0031832 A1 | 2/2017 | Hwang | |
| 2017/0109289 A1 * | 4/2017 | Gonzalez Gonzalez ....................... |
| | | | G06F 12/0895 |
| 2017/0147254 A1 | 5/2017 | Adams et al. | |
| 2017/0153987 A1 | 6/2017 | Gaonkar et al. | |
| 2017/0161194 A1 | 6/2017 | Loh | |
| 2017/0177484 A1 | 6/2017 | Conway | |
| 2017/0185528 A1 * | 6/2017 | Hansson .............. G06F 12/1009 |
| 2017/0236243 A1 * | 8/2017 | Smith ...................... G06T 1/20 |
| | | | 345/501 |
| 2017/0286421 A1 * | 10/2017 | Hayenga ............. G06F 12/1009 |
| 2018/0018278 A1 * | 1/2018 | Bradbury ........... G06F 12/1027 |
| 2018/0150315 A1 | 5/2018 | Dunham et al. | |

(56) References Cited

U.S. PATENT DOCUMENTS

| | | | |
|---|---|---|---|
| 2018/0150321 A1 | 5/2018 | Dunham et al. | |
| 2018/0150322 A1 | 5/2018 | Dunham et al. | |

FOREIGN PATENT DOCUMENTS

| | | |
|---|---|---|
| WO | WO 2016/162817 | 10/2016 |
| WO | WO 2016/204913 | 12/2016 |

OTHER PUBLICATIONS

Memory Management Basics ; Apr. 10, 2014; retrieved from http://www.idc-online.com/technical_references/pdfs/information_technology/Memory_Management_Basics.pdf on Oct. 10, 2018 (Year: 2014).*

Efficient virtual memory for big memory servers; Basu et al.; Proceedings of the 40th Annual International Symposium on Computer Architecture, pp. 237-248; Jun. 23-27, 2013 (Year: 2013).*

Cryptoleq: A Heterogeneous Abstract Machine for Encrypted and Unencrypted Computation; Mazonka et al.; IEEE Transactions on Information Forensics and Security, vol. 11, iss. 9, pp. 2123-2138; May 13, 2016 (Year: 2016).*

Anedda et al., "Suspending, migrating and resuming HPC virtual clusters," Future Generation Computer Systems 26, May 20, 2010, pp. 1063-1072.

Basu et al, "Efficient virtual memory for big memory servers," ACM SIGARCH Computer Architecture News—ICSA '13, vol. 41 Issue 3, Jun. 2013, pp. 237-248.

J. Gandhi et al., "Range Translations for Fast Virtual Memory," in IEEE Micro, vol. 36, No. 3, pp. 118-126, May-Jun. 2016. doi: 10.1109/MM.2016.10.

Karakostas et al., "Redundant Memory Mappings for Fast Access to Large Memories," ISCA'15, Jun. 13-17, 2015.

R. W. Pfile, D. A. Wood and S. K. Reinhardt, "Decoupled Hardware Support for Distributed Shared Memory," Computer Architecture, 1996 23rd Annual International Symposium on, May 24, 1996, pp. 34-34. doi: 10.1109/ISCA.1996.10010.

Petter Svärd, Benoit Hudzia, Johan Tordsson, and Erik Elmroth. 2011. Evaluation of delta compression techniques for efficient live migration of large virtual machines. In Proceedings of the 7th ACM SIGPLAN/SIGOPS international conference on Virtual execution environments (VEE '11). Jul. 2011, ACM, New York, NY, USA, 111-120. DOI=http://dx.doi.org/10.1145/1952682.1952698.

Arm, "ARMv8-A Address Translation," https://static.docs.arm.com/100940/0100/armv8_a_address%20translation_100940_0100_en.pdf, Feb. 28, 2017.

Yang, Junfeng, "Process and Address Space," https://web.archive.org/web/20170329090956if_/http://www.cs.columbia.edu:80/"junfeng/12sp-w4118/lectures/104-proc.pdf, Mar. 29, 2017.

Anonymous, "Fork (system call)," https://web.archive.org/web/20150124080230/https://en.wikipedia.org/wiki/Fork_(system_call), Jan. 24, 2015.

Oehmke, David W., Nathan L. Binkert, Steven K. Reinhardt and Trevor J Mudge. "Design and Applications of a Virtual Context Architecture." (2004).

Jayneel Gandhi, "Efficient Memory Virtualization," Thesis, University of Wisconsin-Madison, Aug. 19, 2016.

Memory Management Basics, www.idc-online.com/technical_references/pdfs/information_technology/Memory_Management_Basics.pdf, 2014.

Zhong Shao, CS422/522 Design & Implementation of Operating Systems Lecture 13: Address Translation, Yale University, Oct. 15, 2015, https://web.archive.org/web/20151217223456/http://flint.cs.yale.edu/cs422/lectureNotes/L13.pdf.

Rouse, Margaret, Definition translation lookaside buffer (TLB), https://whatis.techtarget.com/definition/translation-look-aside-buffer-TLB, Sep. 2014.

U.S. Appl. No. 15/361,871, filed Nov. 28, 2016 entitled "Data Processing", Applicant ARM LTD.

U.S. Appl. No. 15/361,819, filed Nov. 28, 2016 entitled "Data Processing", Applicant ARM LTD.

U.S. Appl. No. 15/361,770, filed Nov. 28, 2016 entitled "Data Processing", Applicant ARM LTD.

Bang, Kwanhu & Park, Sang-Hoon & Jun, Minje & Chung, Eui-Young. (2011). A memory hierarchy-aware metadata management technique for Solid State Disks. Midwest Symposium on Circuits and Systems. 1-4.

C. H. Park, T. Heo, J. Jeong and J. Huh, "Hybrid TLB coalescing: Improving TLB translation coverage under diverse fragmented memory allocations," 2017 ACM/IEEE 44th Annual International Symposium on Computer Architecture (ISCA), Toronto, ON, 2017, pp. 444-456.

Chao-Jui Chang, Jan-Jan Wu, Wei-Chung Hsu, Pangfeng Liu, and Pen-Chung Yew. 2014. Efficient memory virtualization for Cross-ISA system mode emulation. SIGPLAN Not. 49, 7 (Mar. 2014), 117-128.

Grocutt et al., U.S. Appl. No. 15/825,524 unpublished application, filed Nov. 29, 2017.

L. Fiorin, G. Palermo, S. Lukovic, V. Catalano and C. Silvano, "Secure Memory Accesses on Networks-on-Chip," in IEEE Transactions on Computers, vol. 57, No. 9, pp. 1216-1229, Sep. 2008.

M. D. Flouris and A. Bilas, "Violin: a framework for extensible block-level storage," 22nd IEEE / 13th NASA Goddard Conference on Mass Storage Systems and Technologies (MSST'05), Monterey, CA, USA, 2005, pp. 128-142.

Porquet, J & Greiner, A & Schwarz, C., "NoC-MPU: A secure architecture for flexible co-hosting on shared memory MPSoCs," Design, Automation & Test. in Europe, 1-4, 2001.

Sambit K. Shukla, Laxmi N. Bhuyan, "A hybrid shared memory heterogenous execution platform for PCIe-based GPGPUs," 2013 20th International Conference on High Performance Computing (HiPC), vol. 1, pp. 343-352, 2013.

T. Wood et al., "CloudNet: Dynamic Pooling of Cloud Resources by Live WAN Migration of Virtual Machines," in IEEE/ACM Transactions on Networking, vol. 23, No. 5, pp. 1568-1583, Oct. 2015.

U.S. Appl. No. 15/825,524, filed Nov. 29, 2017, Inventor: Grocutt et al.

* cited by examiner

MEMORY ADDRESS TRANSLATION

STATEMENT REGARDING FEDERALLY SPONSORED RESEARCH OR DEVELOPMENT

This invention was made with Government support under the Fast Forward 2 contract awarded by DOE. The Government has certain rights in this invention.

CROSS-REFERENCE TO RELATED APPLICATIONS

This application is related to co-pending patent application Ser. No. 15/649,930 entitled "METHOD AND APPARATUS FOR TWO-LAYER COPY-ON-WRITE; co-pending patent application Ser. No. 15/649,976 entitled "METHOD AND APPARATUS FOR FAST CONTEXT CLONING IN A DATA PROCESSING SYSTEM"; and co-pending patent application Ser. No. 15/650,008 entitled "MEMORY NODE CONTROLLER", all filed on the same date as this application, and which are hereby incorporated herein by reference herein in their entirety.

BACKGROUND

This disclosure relates to memory address translation.

A data processing apparatus may provide each running program or peripheral device with access to a virtual address space defined by virtual memory addresses. Each program or device sees its own virtual address space which contains instructions and data for use by that program or device. Amongst other established advantages, the use of virtual addressing allows the operating system to control memory access by inhibiting one program from accessing or corrupting information used by another program.

When an access is required to a virtual memory address, it is first necessary to translate the virtual memory address to a physical memory address so that the required information can be obtained from or written to the physical memory or a physical memory cache.

A cache known as a translation lookaside buffer (TLB) may be used as part of the address translation process. The TLB stores recently or commonly used translations between virtual and physical memory addresses, on a fixed size page-by-page basis. So, as a first step in an address translation process, a TLB may be consulted to detect whether the TLB already contains the required address translation. If not, then a more involved translation process may be used, for example involving consulting so-called page tables holding address translation information, typically resulting in the TLB being populated with the required translation.

SUMMARY

In an example arrangement there is provided memory address translation apparatus comprising:

a translation data store to store one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space;

detector circuitry to detect whether a given virtual memory address to be translated lies in the range of virtual memory addresses defined by an instance of the translation data in the translation data store;

in which the detector circuitry is configured, when the given virtual memory address to be translated lies outside the ranges of virtual memory addresses defined by any instances of the translation data stored by the translation data store, to retrieve one or more further instances of the translation data; and translation circuitry to apply the translation defined by a detected instance of the translation data to the given virtual memory address.

In another example arrangement there is provided data processing apparatus comprising:

a processor to process data in accordance with virtual memory addresses;

address translation apparatus as defined above, to translate a virtual memory address relating to a processing operation of the processor into an output memory address to access a memory system responsive to the output memory address.

In another example arrangement there is provided memory address translation apparatus comprising:

translation data storing means for storing one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space;

means for detecting whether a given virtual memory address to be translated lies in the range of virtual memory addresses defined by an instance of the translation data in the translation data store;

in which the means for detecting is operable, when the given virtual memory address to be translated lies outside the ranges of virtual memory addresses defined by any instances of the translation data stored by the translation data store, to retrieve one or more further instances of the translation data; and translation means for applying the translation defined by a detected instance of the translation data to the given virtual memory address.

In another example arrangement there is provided a memory address translation method comprising:

storing one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space;

detecting whether a given virtual memory address to be translated lies in the range of virtual memory addresses defined by an instance of the translation data in the translation data store;

when the given virtual memory address to be translated lies outside the ranges of virtual memory addresses defined by any instances of the translation data stored by the translation data store, retrieving one or more further instances of the translation data; and applying the translation defined by a detected instance of the translation data to the given virtual memory address.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

An example embodiment provides memory address translation apparatus comprising:

a translation data store to store one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space;

detector circuitry to detect whether a given virtual memory address to be translated lies in the range of virtual memory addresses defined by an instance of the translation data in the translation data store;

in which the detector circuitry is configured, when the given virtual memory address to be translated lies outside the ranges of virtual memory addresses defined by any instances of the translation data stored by the translation data store, to retrieve one or more further instances of the translation data; and translation circuitry to apply the translation defined by a detected instance of the translation data to the given virtual memory address.

The example embodiments provide a conveniently straightforward memory address translation technique which can alleviate the potential latency and processing requirements of other techniques such as the use of page table walks or the like. The technique can provide variable sized regions of the virtual memory address space, each having a mapping to a corresponding region of the output memory address space, potentially defined by a single instance of translation data. For example, a simple offset can be provided, or a reference address for a particular address in the range of virtual memory addresses.

Advantageously, an instance of translation data can be stored by the apparatus, such that another instance is needed only if a required virtual memory address does not lie within the range of virtual memory addresses defined by the currently held instance(s).

For example, the translation data may indicate an address offset between a virtual memory address in the range of virtual memory addresses and a corresponding output memory address in an output address space. In other examples the translation data indicates a reference memory address in the output address space corresponding to a virtual memory address at a predetermined position relative to the range of virtual memory addresses, so that the translation circuitry is configured to translate the given virtual memory address in the range of virtual memory addresses by adding to or subtracting from the reference address in the output address space an amount dependent upon a difference, in the virtual memory address space, between the given virtual memory address and the virtual memory address at the predetermined position relative to the range of virtual memory addresses. In some examples, the predetermined position is a lowest memory address in the range of virtual memory addresses.

Conveniently, the detector may be configured to access one or more memory locations storing further instances of the translation data. For example, the detector may be configured to retrieve one or more further instances of the translation data from memory locations defined by one or more location parameters indicating addresses in the output memory space.

In order to aim to retrieve a next-most-useful instance of translation data, in some examples the detector is configured to retrieve the one or more further instances of the translation data in an order of usage of the instances of the translation data. For example, the order of usage may be an order of most frequent usage.

In some examples, each instance of translation data comprises administrative data indicating access permissions associated with the range of virtual memory addresses of that instance of translation data.

Another example embodiment provides data processing apparatus comprising:

a processor to process data in accordance with virtual memory addresses;

address translation apparatus as defined above, to translate a virtual memory address relating to a processing operation of the processor into an output memory address to access a memory system responsive to the output memory address.

In some examples, a cache memory may be disposed between the address translation apparatus and the memory system, the cache memory being addressable in the output memory address space. For example, if the cache does not contain a required data item, then reference can be made to a memory system responsive to memory addresses in the output memory address space.

One convenient way of establishing the mapping between the virtual memory address space and the output memory address space is one in which the processor is responsive to context data defining a context applicable to a current task being executed by the processor; and the context data includes location parameters indicating addresses in the output memory space at which one or more further instances of translation data are stored. In this way, the quantity of context data needed to handle this functionality can be small (a pointer or pointers to memory at which the translation data is held).

In some examples, two or more processors may be provided to process data in accordance with virtual memory addresses in a respective virtual memory address space, each processor having a respective address translation apparatus to translate a virtual memory address relating to a processing operation of that processor into an output memory address to access the memory system. The output memory address space can be common to the processors even though they have their own virtual memory address space. For example, the memory system may be configured to operate according to the output memory address space common to interaction with the address translation apparatus of each of the processors.

Some examples provide bypass logic to bypass the translation circuitry when the translation is such that a virtual memory address is equal to a corresponding output memory address. This can avoid having to use the translation apparatus when it is not needed. For example, the operating state of the bypass logic can be set task context data.

Another example embodiment provides memory address translation apparatus comprising:

translation data storing means for storing one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space;

means for detecting whether a given virtual memory address to be translated lies in the range of virtual memory addresses defined by an instance of the translation data in the translation data store;

in which the means for detecting is operable, when the given virtual memory address to be translated lies outside the ranges of virtual memory addresses defined by any instances of the translation data stored by the translation data store, to retrieve one or more further instances of the translation data; and translation means for applying the translation defined by a detected instance of the translation data to the given virtual memory address.

Another example embodiment provides a memory address translation method comprising:

storing one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space;

detecting whether a given virtual memory address to be translated lies in the range of virtual memory addresses defined by an instance of the translation data in the translation data store;

when the given virtual memory address to be translated lies outside the ranges of virtual memory addresses defined by any instances of the translation data stored by the translation data store, retrieving one or more further instances of the translation data; and applying the translation defined by a detected instance of the translation data to the given virtual memory address.

Figure 1:
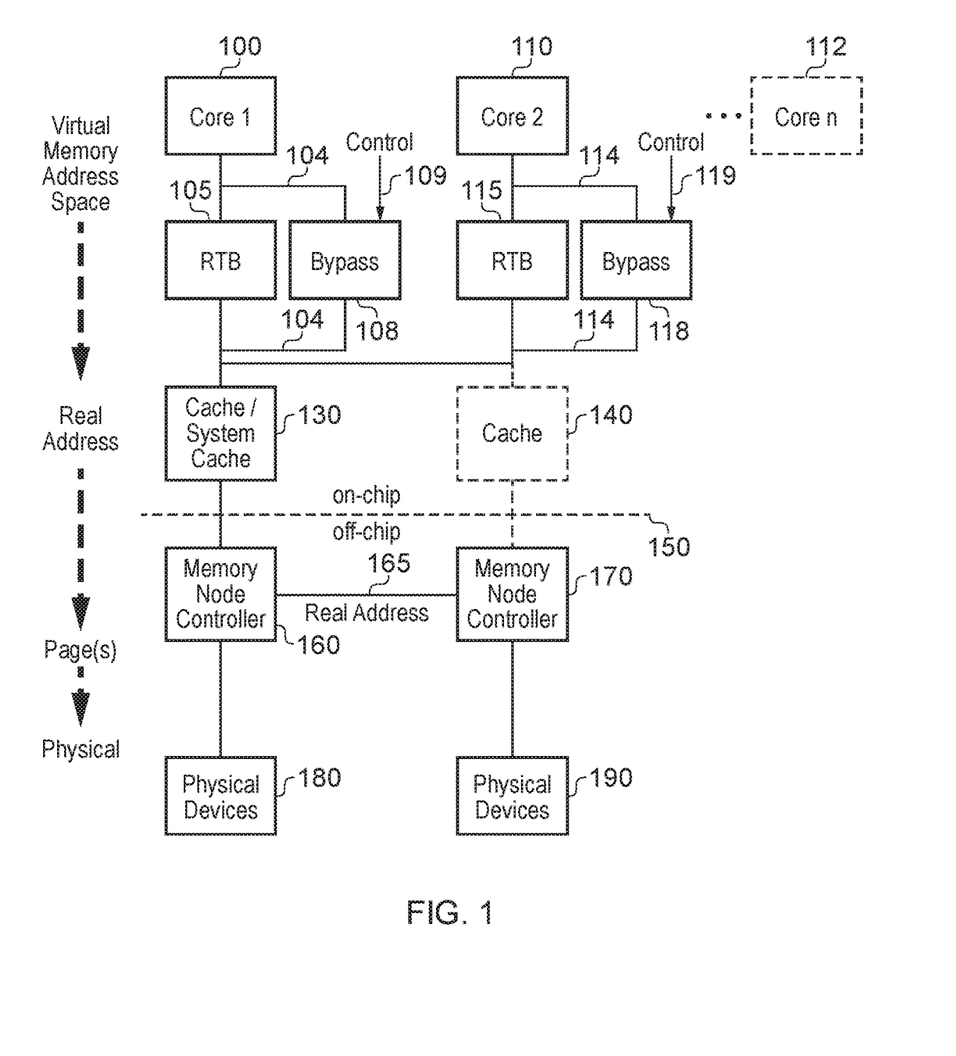
FIG. 1 schematically illustrates a data processing apparatus.

Referring now to the drawings, FIG. 1 schematically illustrates a data processing apparatus.

A number of processor cores 100, 110 are provided. In the example of FIG. 1, two such processor cores are illustrated, but (as shown schematically by the broken line box 112) more processor cores could be provided. Alternatively, the system could comprise just one processor core.

The processor cores are arranged to process data in accordance with virtual memory addresses. For example, each of the processor cores may process data in accordance with virtual memory addresses in a respective virtual memory address space, for example under the control of an operating system or a so-called hypervisor which allocates virtual memory address spaces to the processes being performed by the different processor cores, partly as a technique for avoiding a process associated with one processor core accidently or maliciously accessing data appropriate to a process being executed by another of the processor cores.

A memory address translation apparatus is provided to translate between the virtual memory addresses in the virtual memory address space and so-called real addresses.

In the context of the memory address translation techniques to be discussed below, the real addresses are "output" memory addresses in an output address space (a so-called real address space). This could represent a physical address by which a physical memory device or other addressable unit could be physically addressed. Or, the real (output) memory addresses could represent addresses which need a further stage of address translation before being used to access a physical memory device or other addressable unit. From the point of view of the address translation techniques to be discussed, either of these options is equivalent. That is to say, the address translation techniques start with a virtual memory address and produce an output memory address. Whether or not the overall apparatus then performs another stage of address translation on the output memory address is immaterial to the generation of the output memory address itself.

In FIG. 1, address translation is carried out by a so-called range table buffer (RTB) 105, 115. This performs address translation between a virtual memory address in the virtual memory address space and an output memory address in the output (real) address space. Each of the processor cores has a respective range table buffer. The operation of the range table buffer will be described in detail below.

Bypass logic 108, 118 is provided to selectively bypass the RTB 105, 115 when the address translation is such that a virtual memory address is equal to a corresponding output memory address. The bypass circuitry or logic is controllable by a control signal 109, 119 which will be discussed below. When the bypass logic is enabled, either the RTB 105, 115 does not perform any translation, or the translation performed by the RTB 105, 115 is ignored and the virtual memory address is provided, by a bypass route 104, 114, for use as the output memory address.

The memory address translation operations to be discussed below will assume that the bypass logic is not currently enabled (unless otherwise stated).

The processor cores 100, 110 are implemented or fabricated on an integrated circuit substrate in this example, and may both (or all in the case of more than two) be provided on the same integrated circuit substrate. These devices are referred to in FIG. 1 as being "on-chip".

Also provided on-chip is a cache and/or system cache memory 130 to provide a temporary store for a subset of data held by the memory system to be discussed below, such as a most-recently accessed subset and/or a speculatively fetched subset. As shown in FIG. 1, the two processor cores 100, 110 share a common cache/system cache 130, but in other examples more than one could be provided, and another cache 140 is shown in broken line to illustrate such an arrangement.

The cache/system cache 130 (140) operates according to the output (real) memory addresses generated by the RTB 105, 115.

A broken line 150 indicates a logical boundary between on-chip devices and off-chip devices, although it will be appreciated that this is just an example and that the implementation of any of the modules shown in FIG. 1 on the same integrated circuit or as different circuitries is a matter for a system designer. So, FIG. 1 just represents a schematic example of how the separation of on-chip and off-chip components might be achieved.

Off-chip, one or more memory node controllers 160, 170 are provided, which in turn access one or more respective physical devices 180, 190 such as random access memories (DRAMs). Given that the physical devices 180, 190 operate in a physical address space, two functions of the memory node controllers 160, 170 can include: (a) translation of output (real) memory addresses to physical memory addresses, if a further stage of translation is needed, and (b) management of which of the physical devices 180, 190 needs to be accessed in order to implement a required memory access operation.

The translation operation (a) mentioned above can be carried out either using the techniques to be discussed below, or by a known memory address translation technique. The management operation (b), to manage which of the physical devices 180, 190 should be accessed, can be carried out using, for example, a table or directory stored at one or more of the memory node controllers 160, 170 to indicate a partitioning of the physical address space between physical devices and, in turn, memory node controllers.

It is not a requirement that more than one memory node controller 160, 170 is provided, but in the example of FIG. 1, two memory node controllers are provided. If one of the memory node controllers (such as a the memory node controller 160) receives a request for a memory access transaction which relates to an address handled by another memory node controller such as the memory node controller 170, the first memory node controller 160 can communicate via a data connection 165 with the other memory node controller 170, passing on the output (real) address relating to that transaction and requesting that the transaction be carried out by the second memory node controller 170.

Figure 2A:
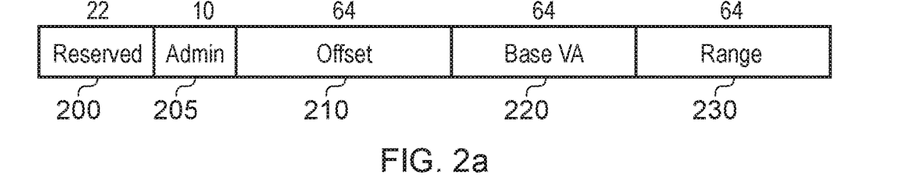
FIGS. 2a and 2b schematically illustrate respective instances of translation data.

The range table buffers (RTBs) 105, 115 operate by storing one or more instances of translation data. FIG. 2a schematically illustrates such an instance of translation data.

Referring to FIG. 2a, an instance (or indeed each instance) of translation data is formed as a 224-bit word comprising 22 reserved bits 200, 10 bits of administrative data (discussed below) 205, 64 bits of address offset data 210, 64 bits of "base virtual address" data 220 and 64 bits of range data 230.

The data 220, 230 together define a range of virtual memory addresses between respective virtual memory address boundaries in the virtual memory address space. In the example of FIG. 2a, the range of virtual memory addresses is between the address represented by Base VA up to and including the address represented by Base VA+Range. Here, it will of course be appreciated that it is not necessarily the case that the lowest address in the range has to be defined by the field Base VA. More generally, a range of virtual addresses can be defined by one reference value at a predetermined position relative to the range of virtual addresses, so that in other examples the field 220 could be occupied by (for example) "highest VA" such that the range of virtual memory addresses is defined by "highest VA-Range" up to "highest VA". In other examples, the field 220 could be occupied by (for example) "central VA" such that the range of virtual memory addresses extends between "central VA-Range" up to "central VA+Range". Again, "central VA" would be an example of a virtual memory address at a predetermined position relative to the range of virtual memory addresses. However, the present examples will assume that the field 220 is occupied by the Base VA and that the respective virtual memory address boundaries of the range of virtual memory addresses are in this example base VA and Base VA+Range.

The offset field 210 contains an address offset between a virtual memory address in the range of virtual memory addresses and a corresponding output memory address in an output address space, which is applied as a linear sum to a virtual memory address in the range defined by the boundaries discussed above to generate the respective output memory address. The offset can be positive, negative or indeed zero. So, for an arbitrary virtual memory address VA_test which falls within the range defined by base VA and base VA+Range, the translated (output) memory address in the output memory address space can be expressed as:

$$VA\_test + offset$$

In other words, in this example, the offset represents a simple difference between any virtual memory address in the virtual memory address range and a corresponding output memory address.

Figure 2B:
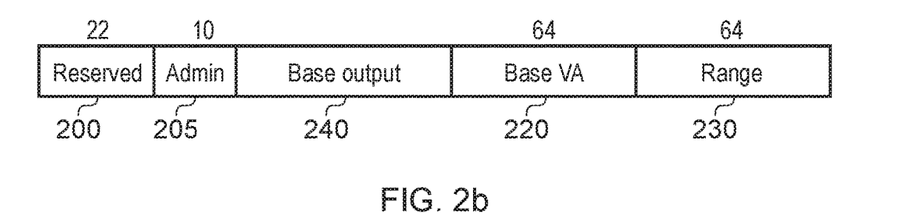

Another example is shown schematically in FIG. 2b, in which the fields 200, 205, 220, 230 can be identical to those shown in FIG. 2a, but in place of the offset fields 210, a field referred to as base output 240 is provided which indicates the output memory address corresponding to (in this example) the address base VA in the virtual memory address space. More generally, the field 240 can indicate a reference memory address in the output address space corresponding to a virtual memory address at a predetermined position (such as the predetermined positions in the examples discussed above) relative to the range of virtual memory addresses so that the translation circuitry to be discussed below is configured to translate a given virtual memory address in the range of virtual memory addresses by adding to or subtracting from the reference address in the output address space and are now dependent upon a difference, in the virtual memory address space, between the given virtual memory address and the virtual memory address at a predetermined position relative to the range of virtual memory addresses. This gives a translation function as:

$$(VA\_test - predetermined\ VA) + reference$$

The type of translations defined by the translation data of FIG. 2b provide a potentially variable size of range covered by a single instance of translation data, and can provide multiple translations mapping different virtual memory addresses to the same output memory address, if that is required.

Figure 3:
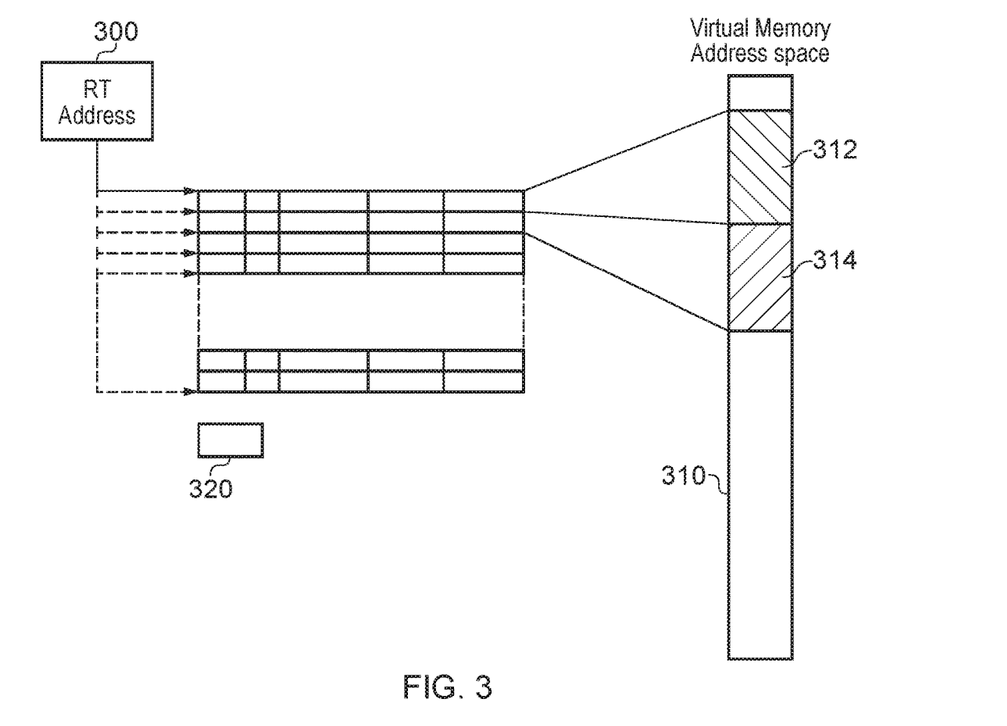
FIG. 3 schematically illustrates the storage of multiple instances of translation data.

FIG. 3 schematically illustrates the storage of multiple instances of the translation data of FIG. 2a or 2b, for example in the cache 130 (140) or in the memory system off-chip, for example in one of the physical devices 180, 190.

A storage location which defines the storage of a set of instances of translation data is provided by a variable RT address 300. The derivation of the variable RT address will be discussed further below. The memory address represented by RT address can be, for example, a real (output) address, a physical memory address or another memory address. In the present example, the variable RT address represents a physical memory address of the set of instances of translation data in physical memory.

As indicated schematically by the broken arrows of FIG. 3, the variable RT address can provide location information for each of the (or more than one of the) instances. Or the locations can be inferred from the size of each instance (for example 224 bits) and the location of a reference one of the instances.

The instances of translation data can be pre-stored in the memory by, for example, the operating system and/or hypervisor and can be ordered, for example, in order of their applicability to the virtual memory address space. By way of example, the virtual memory address space is illustrated as a rectangle 310 to the right hand side of FIG. 3 and the ranges of virtual memory addresses represented by an upper two (as drawn) instances of translation data are shown schematically as ranges 312, 314 in FIG. 3. Further data 320 can be stored, either by the RTB (in the store 460 discussed below) or alongside the instances of translation data in the memory, indicating attributes such as a most frequently and/or most recently used instance of translation data, and/or the frequency of use of each instance of translation data, and/or how recently each instance of translation data has been accessed, or the like.

Figure 4:
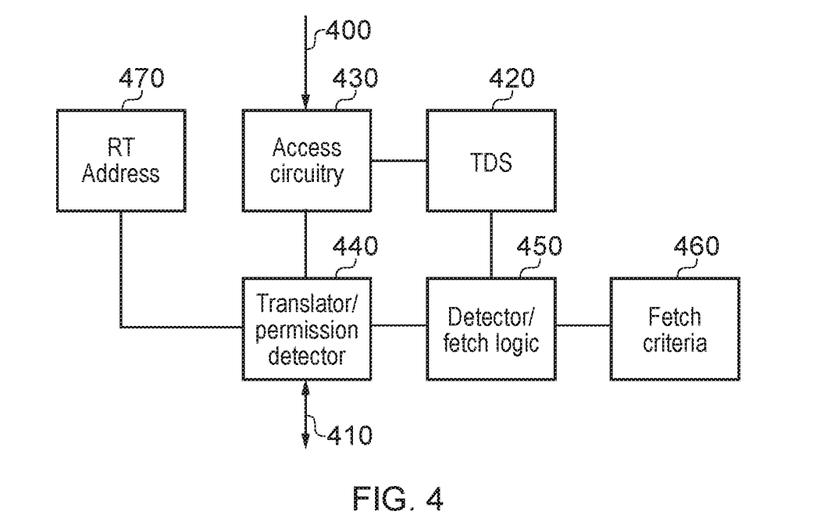
FIG. 4 schematically illustrates memory address translation apparatus.

FIG. 4 schematically illustrates memory address translation apparatus such as the RTB 105, 115 of FIG. 1, as an example of translation circuitry which can apply a translation defined by a detected instance of the translation data to a given virtual memory address.

The apparatus comprises an input 400 to receive a virtual memory address, an output 410 to output an output (translated) memory address, a translation data store 420 to store one or more instances of translation data as discussed above, access circuitry 430, a translator/permission detector 440, a detector/fetch logic 450, a store 460 to store fetch criteria, and a store 470 to store the RT address variable.

In operation, as discussed above, the translation data store 420 stores one or more instances of translation data such as the translation data shown in FIGS. 2a and 2b providing address range boundary values (such as base VA and range) defining a range of virtual memory addresses between respective virtual memory address boundaries in the virtual memory address space, and indicating a translation (such as the offset or base output fields) between a virtual memory address in the range of virtual memory addresses and a corresponding output memory address in the output memory address space.

In response to a virtual address received on the input 400, the access circuitry 430 accessing translation data held in the translation data store 420. For example, a single instance of translation data may be held at any one time in the translation data store 420. The detector/fetch logic 450 acts as detector circuitry to detect whether the virtual memory address to be translated lies within the range of virtual memory addresses defined by an (or the) instance of the translation data in the translation data store 420. If so, then the detector/fetch logic provides the data indicating the translation (such as the offset or base output fields to the translator/permission detector 440) along with the administrative data in the field 205. The translator/permission detector circuitry 440 applies the translation defined by a (or the) detected instance of the translation data to the input (given) virtual memory address to determine the translated (output) memory address. This is provided on the output 410 to the cache/system cache 130 and, if necessary, to one or more of the memory node controllers 160, 170.

If the detector/fetch logic 450 detects that the virtual memory address to be translated does not lie in the range of virtual memory addresses defined by an (or the) instance of the translation data in the translation data store 420, then the detector/fetch logic initiates the fetching of another instance (or one or more further instances) of translation data. To do this, the detector/fetch logic 450 can use fetch criteria stored in the fetch criteria store 460.

Examples of fetch criteria have been discussed above, and may include, for example, the most recently used instance of translation data (which is not an instance currently held by the translation data store), the instance of translation data which is most frequently used and which is not currently held in the translation data store, or the like. The detector/fetch logic 450 initiates the fetching of the translation data using the RT address variable stored in the store 470. The fetched instance of translation data is then stored in the translation data store, evicting the currently stored instance (if just one is held) or a least recently and/or least frequently used instance (of those held in the translation data store 420) if more than one instance is held there. Therefore, the detector/fetch logic 450 is configured, when the given virtual memory address to be translated lies outside the ranges of virtual memory addresses defined by any instances of the translation data stored by the translation data store, to retrieve one (or indeed more) further instances of the translation data. To do this, the detector/fetch logic 450 may access one or more memory locations (for example defined or referenced by the variable RT address) storing further instances of the translation data. In this way, the variable RT address may act as a location parameter and the detector/fetch logic 450 is configured to retrieve one or more further instances of the translation data from memory locations defined by one or more such location parameters indicating addresses in the output memory space (or indeed in the physical memory space if that is different).

As discussed above, the fetch criteria 460 may be such that the detector/fetch logic 450 is configured to retrieve the one or more further instances of the translation data in an order of usage of the instances of translation data. For example, the order of usage may be an order of most frequent usage, although it could be an order of most recent usage.

Another function of the translator/permission detector 440 is to detect the administrative data 205 of the instance of translation data used in respect of the current translation, and which indicates access permissions associated with the range of virtual memory addresses of that instance of translation data. This permission data can either by passed on to the cache/system cache 130 as permission data associated with the current memory access, or can be used to control or gate current attempted memory accesses such that if they breach the permission data they are not forwarded to the cache/system cache 130 by the translator/permission detector.

Therefore, the arrangement of FIG. 1 can provide one or more processors to process data in accordance with virtual memory addresses, and address translation apparatus such as that shown in FIG. 4 to translate a virtual memory address relating to a processing operation of the one or more processors into an output memory address to access a memory system responsive to the output memory address. The cache/system cache 130 may provide an example of a cache memory disposed between the address translation apparatus and the memory system, the cache memory being addressable in the output memory address space. The memory node controllers 160, 170 and physical devices 180, 190 can provide a memory system responsive to memory addresses in the output memory address space.

If two or more processor cores 100, 110 are used, each processor can have a respective address translation apparatus 105, 115 to translate a virtual memory address relating to a processing operation of that processor 100, 110 into an output memory address to access the memory system 160, 170, 180, 190. As mentioned above, each processor 100, 110 may operate to process data in accordance with virtual memory addresses in a respective virtual memory address space. However, the real (output) memory address space can be common as between the processors 100, 110, such that the memory system 160, 170, 180, 190 is configured to operate according to the output memory address space common to interaction with the address translation apparatus 105, 115 of each of the processors.

Figure 5:
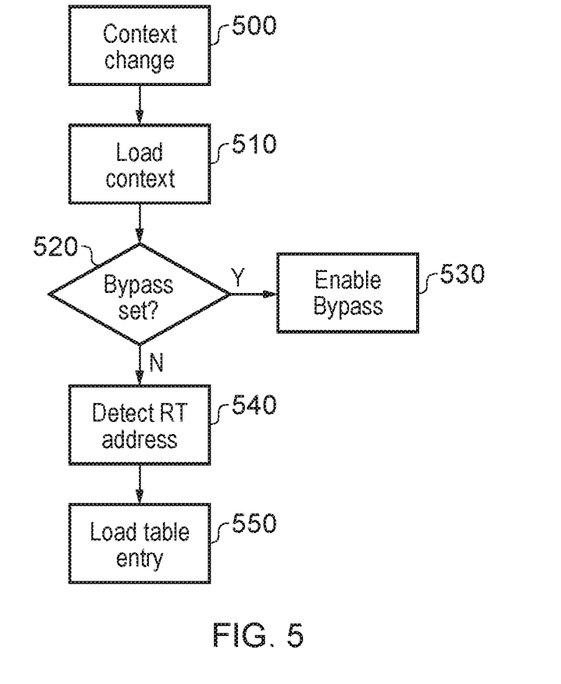
FIG. 5 is a schematic flowchart illustrating an initialisation process.

FIG. 5 is a schematic example of an initialisation process.

The variable RT address can simply be established for the whole of run time at start up or boot of the system. Similarly, the control 109, 119 to indicate to the apparatus whether the bypass function should be enabled can also be established for the whole of run time at boot or start up. However, in other examples, these items are established at a so-called context switch.

By way of background, in arrangements of one or more interconnected processors, a program task such as a thread can be executed by the one or more processors in successive portions, possibly interspersed with portions of execution of other program tasks. Execution can be passed from one processor to another in a multi-processor or multi-core system. To enable this, a process referred to as context switching may take place.

In a context switch, each processor is configured to save context data relating to or applicable to a program task following execution of that program task by that processing element, and to load context data, previously saved by that processor element or another of the processors, at resumption of execution of a program task.

The context data can indicate a current processing state of the processor at the time that execution of the particular program task was paused or handed over. However, it can also provide some parameters established, for example, by the operating system and/or hypervisor which are common to each occasion on which that program task is executed. In the present example, the context data can indicate whether the bypass function should be enabled and the location within memory of the instances of translation data applicable to execution of that program task. So, on loading the context data, the bypass function is enabled or disabled and, assuming the bypass function is disabled, the location within memory of the appropriate address translation data to be used by the RTB 105, 115 is identified. FIG. 5 schematically illustrates this initialisation process as a schematic flowchart starting with, at a step 500, a change of context corresponding to a task swap as discussed above. This leads to the relevant processor loading a new context at a step 510.

With reference to the parameters defined by the newly loaded context, the processor core detects whether the bypass operation should be used for this portion of execution of the program task. If the answer is yes then the bypass logic 108, 118 is enabled by the control signal 109, 119 at a step 530. If the answer is no, then control passes to a step 540 at which the variable RT address is detected (for example, from the context data applicable to the current task) and is stored in the store 470 of FIG. 4. Using the variable RT address, at least one table entry (that is to say, an instance of translation data) is retrieved and stored in the translation data store 420 at a step 550.

Figure 6:
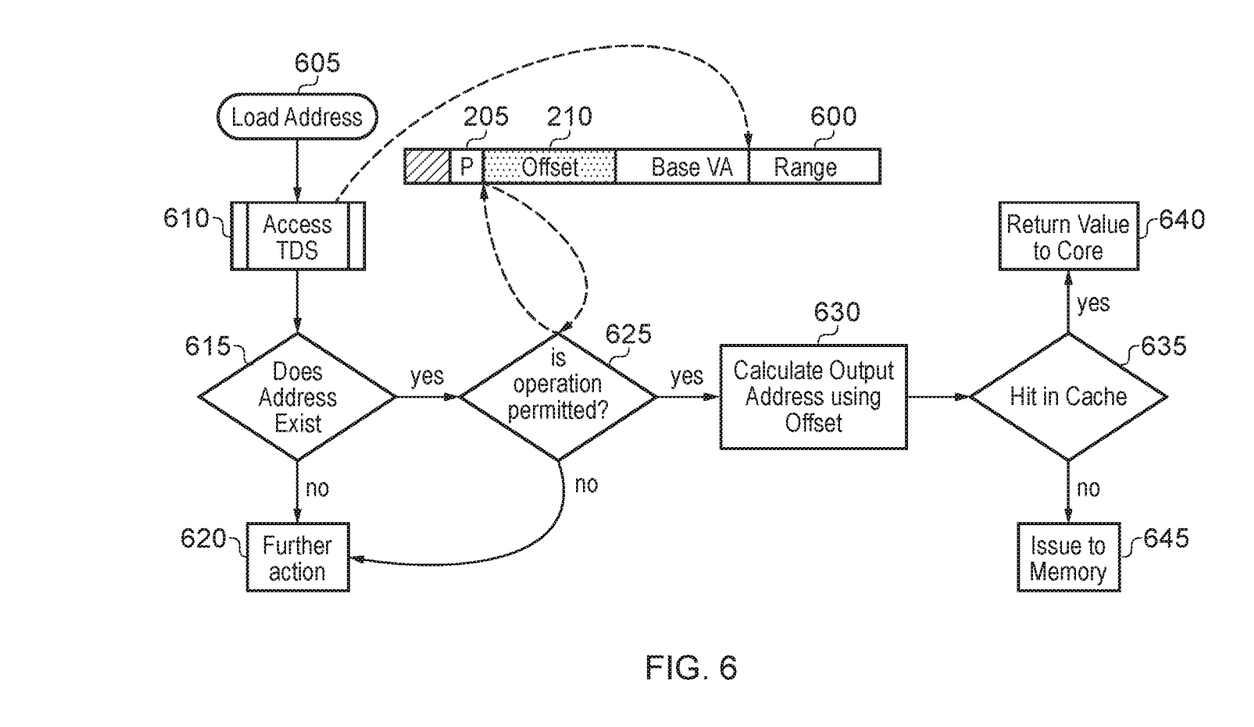
FIGS. 6 and 7 are schematic flowcharts illustrating methods of memory access.
Figure 7:
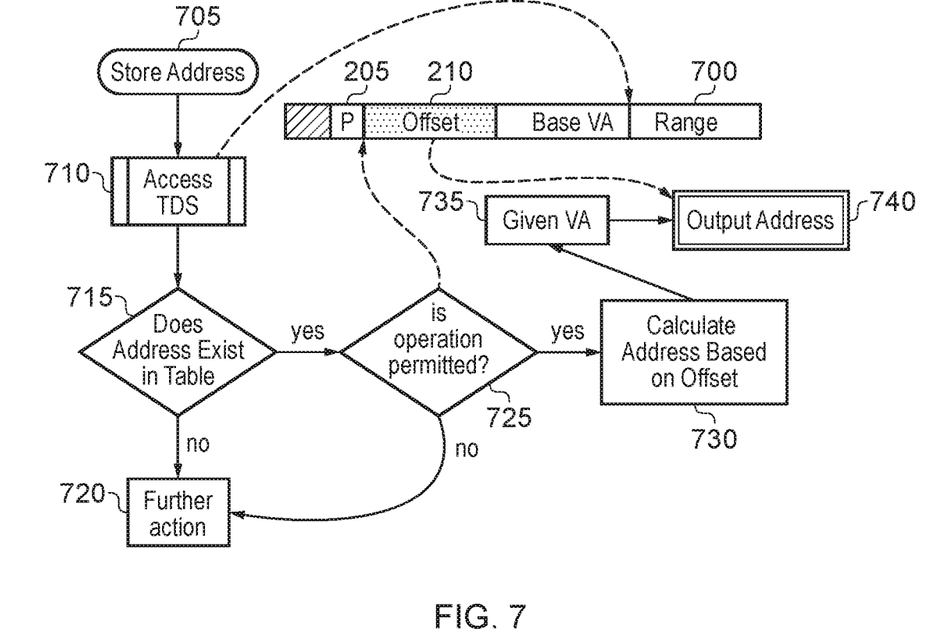

FIGS. 6 and 7 are schematic flowcharts illustrating methods of memory access. In particular, FIG. 6 schematically represents a load operation and FIG. 7 schematically represents a stall operation. In each case, reference is made to an instance 600, 700 of translation data held by the translation data store 420.

Referring first to FIG. 6, a load address 605 is generated by one of the processor cores 100, 110 indicative of the virtual address from which one or more data items should be loaded. At a step 610, the access circuitry 430 looks up the one or more instances of translation data held by the translation data store 420. A detection is then made by the detector/fetch logic 450 at a step 615 as to whether the given virtual address (representing the load address) exists within the range or ranges defined by the translation data held in the translation data store 420. If the answer is no, then further action 620 to be discussed below is carried out. If, however, the answer is yes then control passes to a step 625 at which the translator/permission detector 440 accesses the administrative data field 205 within the translation data to detect whether the current operation is permitted according to the permission data associated with the range of virtual addresses defined by that instance of translation data. If the answer is no, then control passes to the step 620 at which further action (in this case the raising of a fault condition) is carried out. If, however, the answer is yes then the translator/permission detector 440 calculates the output address at a step 630 using the offset field 210 of the instance of translation data held in the translation data store 420.

The output memory address is passed to the cache/system cache 130 and at a step 635 a detection is made as to whether data corresponding to that output address is currently held in the cache/system cache 130. If the answer is yes then at a step 640 the required data item is returned to the processor core which initiated the transaction. If the answer is no then at a step 645 the memory access is referred to the memory system 160, 170, 180, 190 for processing.

A similar arrangement is shown schematically in FIG. 7 which illustrates a data storage operation.

Here, as mentioned above, reference is made to an instance 700 of translation data currently held by the translation data store 420.

At a step 705, the virtual address representing a required storage address is established by the relevant processor core.

At a step 710, the access circuitry 430 accesses the translation data store to detect whether the store address established at the step 705 lies within the range defined by the one or more stored instances of translation data. If, at a step 715, the store address does not lie within the range or ranges, then control passes to a step 720 at which further action to be discussed below is taken. If, however, the answer is yes, then control passes to a step 725 at which the translator/permission detector 440 detects from the administrative data field 205 whether the current operation is permitted. If the answer is no, control passes to the step 720 at which further action (a fault condition in this example) is carried out.

If, however, the answer is yes at the step 725 then control passes to a step 730 which calculates the output address for storage of the current data based upon the given virtual address representing the store address (735) and the offset field 210 to generate the output address 740 for use in the storage operation.

Figure 8:
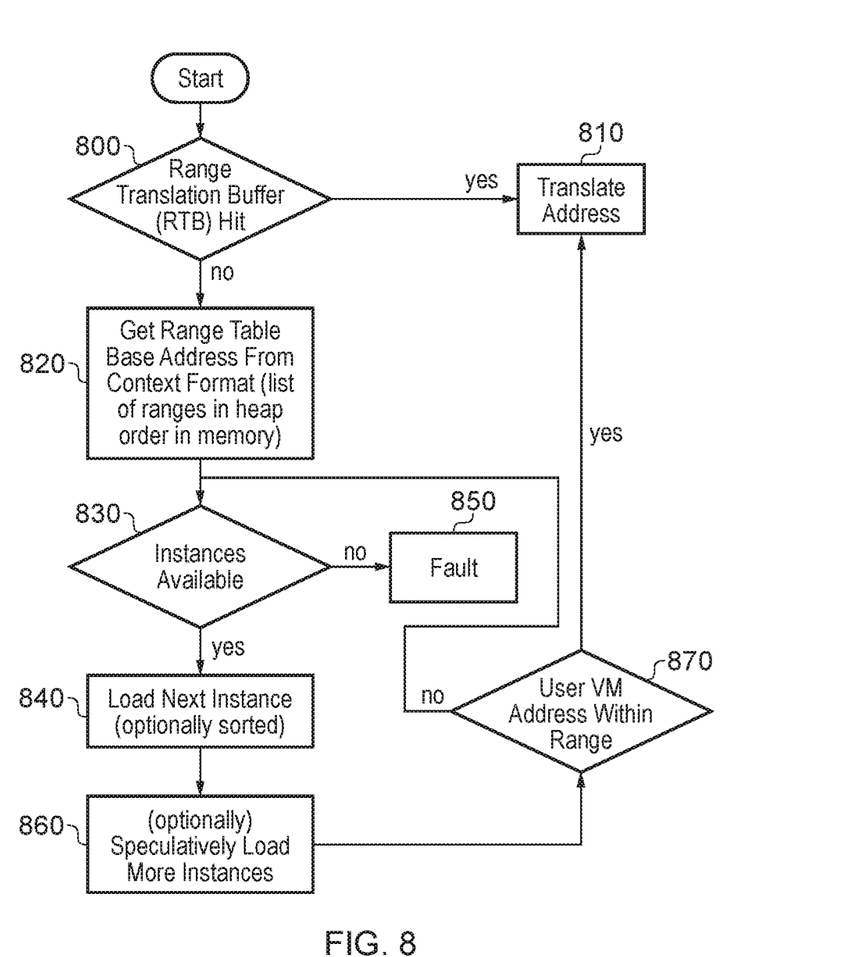
FIG. 8 is a schematic flowchart illustrating a memory address translation method.

FIG. 8 is a schematic flowchart illustrating a memory address translation method, and in particular deals with the negative outcome of the steps 615, 715 of FIGS. 6 and 7, when it is detected that a currently required virtual address does not lie within the range or ranges defined by the one or more instances of translation data held by the translation data store.

Referring to FIG. 8, at a step 800, if there is a "hit", which is to say the current virtual memory address to be translated does lie within one of the ranges defined by the one or more instances of translation data held by the translation data store 420, then control passes to a step 810 which summarises the translation process discussed above, and the current (given) virtual address is translated into a corresponding output memory address.

However, if the outcome is no from the step 800, corresponding to the negative outcome of the steps 615, 715, then control passes to a step 820 at which the RT address (RT base address) which forms part of the context format and may optionally be buffered or stored by the RTB 105, 115 in the store 470, is accessed.

At a step 830, if the RTB 105, 115 detects that instances of translation data are indeed available to be accessed (that is to say, they are not all currently held by the translation data store 420) then control passes to a step 840. If there are no more instances available to be retrieved then control passes to a step 850 at which a fault condition is established.

At the step 840, a next instance is retrieved by the detector/fetch logic 450. These may optionally be accessed in a sorted order—for example they may be sorted in order of usage, for example by frequency of usage. so that a next most used instance is accessed. Optionally, at a step 860, one or more other instances can be speculatively loaded as well.

The test of the step 800 is effectively repeated at a step 870. If the given virtual address for translation is within the range or ranges defined by the newly loaded instance then control can pass to the step 810 for the translation to be performed. If not, control returns to the step 830 so that one or more other instances (if available) are loaded again with the step 840, or a fault condition is established at the step 850 if no more instances are available.

Figure 9:
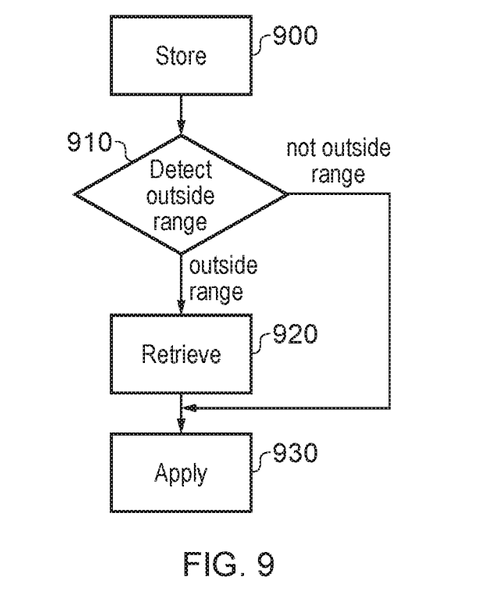
FIG. 9 is a schematic flowchart illustrating a memory address translation method.

FIG. 9 is a schematic flowchart illustrating a memory address translation method comprising:

storing (at a step 900) one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space;

detecting (at a step 910) whether a given virtual memory address to be translated lies in the range of virtual memory addresses defined by an instance of the translation data in the translation data store;

when the given virtual memory address to be translated lies outside the ranges of virtual memory addresses defined by any instances of the translation data stored by the translation data store, retrieving (at a step 920) one or more further instances of the translation data; and applying (at a step 930) the translation defined by a detected instance of the translation data to the given virtual memory address.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

Accordingly, some features of the disclosed embodiments are set out in the following numbered items:

1. Memory address translation apparatus comprising: a translation data store to store one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space; detector circuitry to detect whether a given virtual memory address to be translated lies in the range of virtual memory addresses defined by an instance of the translation data in the translation data store; in which the detector circuitry is configured, when the given virtual memory address to be translated lies outside the ranges of virtual memory addresses defined by any instances of the translation data stored by the translation data store, to retrieve one or more further instances of the translation data; and translation circuitry to apply the translation defined by a detected instance of the translation data to the given virtual memory address.

2. Apparatus according to item 1, in which the translation data indicates an address offset between a virtual memory address in the range of virtual memory addresses and a corresponding output memory address in an output address space.

3. Apparatus according to item 1, in which the translation data indicates a reference memory address in the output address space corresponding to a virtual memory address at a predetermined position relative to the range of virtual memory addresses, so that the translation circuitry is configured to translate the given virtual memory address in the range of virtual memory addresses by adding to or subtracting from the reference memory address in the output address space an amount dependent upon a difference, in the virtual memory address space, between the given virtual memory address and the virtual memory address at the predetermined position relative to the range of virtual memory addresses.

4. Apparatus according to item 3, in which: the predetermined position is a lowest memory address in the range of virtual memory addresses.

5. Apparatus according to item 1, in which the detector is configured to access one or more memory locations storing further instances of the translation data.

6. Apparatus according to item 5, in which the detector is configured to retrieve one or more further instances of the translation data from memory locations defined by one or more location parameters indicating addresses in the output memory space.

7. Apparatus according to item 5, in which the detector is configured to retrieve the one or more further instances of the translation data in an order of usage of the instances of the translation data.

8. Apparatus according to item 7, in which the order of usage is an order of most frequent usage.

9. Apparatus according to item 1, in which each instance of translation data comprises administrative data indicating access permissions associated with the range of virtual memory addresses of that instance of translation data.

10. Data processing apparatus comprising: a processor to process data in accordance with virtual memory addresses; address translation apparatus according to item 1, to translate a virtual memory address relating to a processing operation of the processor into an output memory address to access a memory system responsive to the output memory address.

11. Apparatus according to item 10, comprising a cache memory disposed between the address translation apparatus and the memory system, the cache memory being addressable in the output memory address space.

12. Apparatus according to item 10, in which: the processor is responsive to context data defining a context applicable to a current task being executed by the processor; and the context data includes location parameters indicating addresses in the output memory space at which one or more further instances of translation data are stored.

13. Apparatus according to item 10, comprising: a memory system responsive to memory addresses in the output memory address space.

14. Apparatus according to item 13, comprising: two or more processors to process data in accordance with virtual memory addresses in a respective virtual memory address space, each processor having a respective address translation apparatus to translate a virtual memory address relating to a processing operation of that processor into an output memory address to access the memory system.

15. Apparatus according to item 14, in which the memory system is configured to operate according to the output memory address space common to interaction with the address translation apparatus of each of the processors.

16. Apparatus according to item 1, comprising bypass logic to bypass the translation circuitry when the translation is such that a virtual memory address is equal to a corresponding output memory address.

17. Memory address translation apparatus comprising: translation data storing means for storing one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space; means for detecting whether a given virtual memory address to be translated lies in the range of virtual memory addresses defined by an instance of the translation data in the translation data store; in which the means for detecting is operable, when the given virtual memory address to be translated lies outside the ranges of virtual memory addresses defined by any instances of the translation data stored by the translation data store, to retrieve one or more further instances of the translation data; and translation means for applying the translation defined by a detected instance of the translation data to the given virtual memory address.

18. A memory address translation method comprising: storing one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space; detecting whether a given virtual memory address to be translated lies in the range of virtual memory addresses defined by an instance of the translation data in the translation data store; when the given virtual memory address to be translated lies outside the ranges of virtual memory addresses defined by any instances of the translation data stored by the translation data store, retrieving one or more further instances of the translation data; and applying the translation defined by a detected instance of the translation data to the given virtual memory address.

We claim:

1. Memory address translation apparatus comprising:
    a translation data store to store one or more instances of translation data, where each instance of translation data provides address range boundary values defining a range of virtual memory addresses between respective virtual memory address boundaries in a virtual memory address space, and indicating a translation between a virtual memory address in the range of virtual memory addresses and a corresponding output memory address in an output address space;
    detector circuitry to detect whether a given virtual memory address to be translated lies in the range of virtual memory addresses defined by an instance of the translation data in the translation data store;
    in which the detector circuitry, when the given virtual memory address to be translated lies outside the ranges of virtual memory addresses defined by any instances of the translation data stored by the translation data store:
        retrieves a further instance of translation data that provides address range boundary values defining a further range of virtual memory addresses in the virtual memory address space, and indicates a translation between the virtual memory address in the further range of virtual address and a corresponding output memory address in the output address space, where the further range of virtual addresses includes the given virtual address; and
        stores the further instance of the translation data in the translation data store; and
    translation circuitry to apply the translation defined by a detected instance of the translation data to the given virtual memory address.

2. Apparatus according to claim 1, in which the translation data of the one or more instances of translation data and the further instance of translation data indicates an address offset between a virtual memory address in the range of virtual memory addresses and a corresponding output memory address in an output address space.

3. Apparatus according to claim 1, in which the translation data of the one or more instances of translation data and the further instance of translation data indicates a reference memory address in the output address space corresponding to a virtual memory address at a predetermined position relative to the range of virtual memory addresses, so that the translation circuitry is configured to translate the given virtual memory address in the range of virtual memory addresses by adding to or subtracting from the reference memory address in the output address space an amount dependent upon a difference, in the virtual memory address space, between the given virtual memory address and the virtual memory address at the predetermined position relative to the range of virtual memory addresses.

4. Apparatus according to claim 3, in which:
    the predetermined position is a lowest memory address in the range of virtual memory addresses.

5. Apparatus according to claim 1, in which the detector is configured to access one or more memory locations storing further instances of the translation data.

6. Apparatus according to claim 5, in which the detector is configured to retrieve one or more further instances of the translation data from memory locations defined by one or more location parameters indicating addresses in the output memory space.

7. Apparatus according to claim 5, in which the detector is configured to retrieve the one or more further instances of the translation data in an order of usage of the instances of the translation data.

8. Apparatus according to claim 7, in which the order of usage is an order of most frequent usage.

9. Apparatus according to claim 1, in which each instance of translation data comprises administrative data indicating access permissions associated with the range of virtual memory addresses of that instance of translation data.

10. Data processing apparatus comprising:
a processor to process data in accordance with virtual memory addresses;
an address translation apparatus according to claim 1, to translate a virtual memory address relating to a processing operation of the processor into an output memory address to access a memory system responsive to the output memory address.

11. Apparatus according to claim 10, comprising a cache memory disposed between the address translation apparatus and the memory system, the cache memory being addressable in the output memory address space.

12. Apparatus according to claim 10, in which:
the processor is responsive to context data defining a context applicable to a current task being executed by the processor; and
the context data includes location parameters indicating addresses in the output memory space at which one or more further instances of translation data are stored.

13. Apparatus according to claim 10, comprising:
a memory system responsive to memory addresses in the output memory address space.

14. Apparatus according to claim 13, comprising:
two or more processors to process data in accordance with virtual memory addresses in a respective virtual memory address space, each processor having a respective address translation apparatus to translate a virtual memory address relating to a processing operation of that processor into an output memory address to access the memory system.

15. Apparatus according to claim 14, in which the memory system is configured to operate according to the output memory address space common to interaction with the address translation apparatus of each of the processors.

16. Apparatus according to claim 1, comprising bypass logic to bypass the translation circuitry when the translation is such that a virtual memory address is equal to a corresponding output memory address.

17. Memory address translation apparatus comprising:
translation data storing means for storing one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space;
means for detecting whether a given virtual memory address to be translated lies in the range of virtual memory addresses defined by an instance of the translation data in the translation data storing means;
in which the means for detecting, when the given virtual memory address to be translated lies outside the ranges of virtual memory addresses defined by any instances of the translation data stored by the translation data storing means:
retrieves a further instance of translation data that provides address range boundary values defining a further range of virtual memory addresses in the virtual memory address space, and indicates a translation between the virtual memory address in the further range of virtual address and a corresponding output memory address in the output address space, where the further range of virtual addresses includes the given virtual address; and
stores the further instance of translation data in the translation data storing means; and
translation means for applying the translation defined by a detected instance of the translation data to the given virtual memory address.

18. A memory address translation method comprising:
storing, in a translation data store, one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space;
detecting whether a given virtual memory address to be translated lies in the range of virtual memory addresses defined by an instance of the translation data in the translation data store;
when the given virtual memory address to be translated lies outside the ranges of virtual memory addresses defined by any instances of the translation data stored by the translation data store:
retrieving a further instance of translation data that provides address range boundary values defining a further range of virtual memory addresses in the virtual memory address space, and indicates a translation between the virtual memory address in the further range of virtual address and a corresponding output memory address in the output address space, where the further range of virtual addresses includes the given virtual address; and
storing the further instance of translation data in the translation data store; and
applying the translation defined by a detected instance of the translation data to the given virtual memory address.

* * * * *